Aug. 4, 1959            F. A. KROHM            2,897,529
WINDSHIELD WIPER BLADE ASSEMBLY AND PRESSURE DEVICE THEREFOR
Filed June 1, 1954
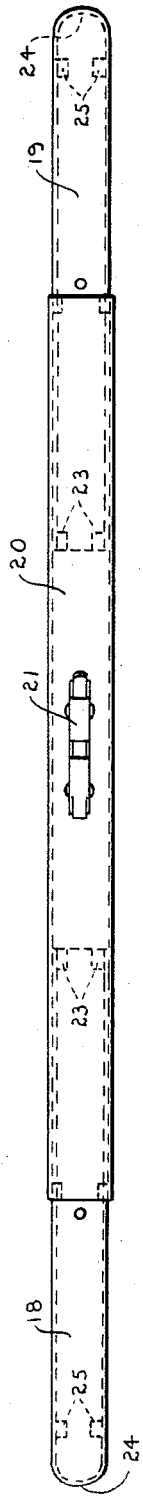
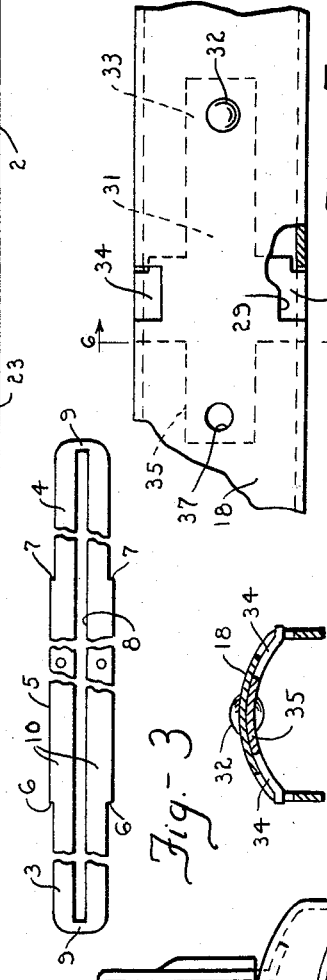
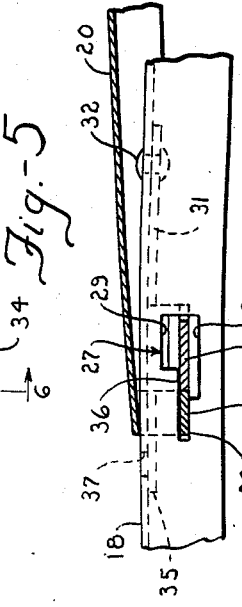
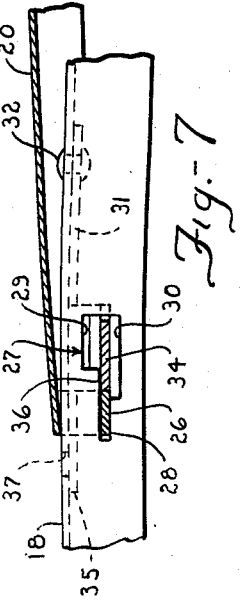
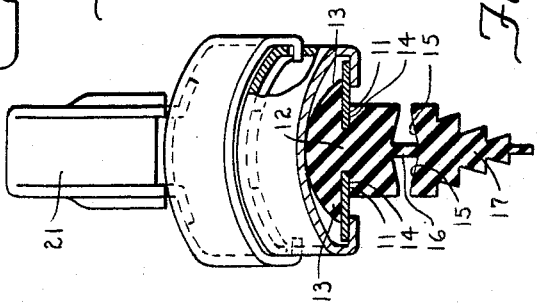
INVENTOR.
FRED A. KROHM
BY
Charles N. Penfield
ATTORNEY

United States Patent Office 2,897,529
Patented Aug. 4, 1959

2,897,529

WINDSHIELD WIPER BLADE ASSEMBLY AND PRESSURE DEVICE THEREFOR

Fred A. Krohm, Hobart, Ind., assignor to The Anderson Company, a corporation of Indiana Application June 1, 1954, Serial No. 433,403

15 Claims. (Cl. 15—245)

This invention relates generally to windshield wipers and more particularly to a wiper which will wipe a curved or flat windshield.

The wiper may be constructed in various ways but as herein shown comprises a blade assembly and a pressure distributing device operatively connected to the blade assembly. The blade assembly includes a resilient wiping element and a resiliently flexible support detachably connected to the element and the pressure device preferably includes a pair of secondary yokes having their ends connected to the blade at longitudinally spaced points, a primary yoke or bridge having its ends connected to intermediate portions of the secondary yokes, and a connector carried by the primary yoke for attachment with a wiper arm.

One of the important objects of the invention is to provide a blade assembly of which the support thereof is formed with reduced corresponding extremities to which the secondary yokes are respectively connected. More specifically in this regard, the support is of a lesser width or narrower at its extremities than along its central area. A secondary yoke slidably receives each of these extremities for applying pressure thereto and due to this variation in width, shoulders are formed on the support to provide abutments or stops which are engageable with the inner ends of the secondary yokes for predetermining the extent of the relative sliding movement between the pressure device and blade assembly.

A particular object of the invention is to provide a wiper in which the secondary yokes are preferably first slid onto the reduced extremities of the support, after which the ends of the primary yoke may be readily snapped into connection with the secondary yokes for holding the parts operatively assembled.

A significant objective of the invention is to provide means for connecting the ends of the secondary yoke to the support in such a manner that portions of such ends will bear against the resilient wiper element in order to dampen or subdue vibration or noise between the pressure device and blade assembly.

A specific object of the invention is to provide improved detachable connection means between the ends of the primary yoke and the secondary yokes.

A further object of the invention is to provide improved connections between the primary and secondary yokes which serve to control or limit lateral movement of the secondary yokes with respect to the primary yoke.

An additional object of the invention is to provide an improved method of connecting the components of the pressure device together and to the blade assembly.

A particular object of the invention is to design and construct the primary and the secondary yokes arcuate in cross-section and substantially conceal from view the support to promote harmony and continuity and substantially prevent entry of snow, sleet and other foreign matter between the secondary yokes and support.

Other objects and advantages of the invention will become apparent after the description hereinafter set forth is considered in conjunction with the drawings annexed hereto.

In the drawings:

Figure 1 is a top view of the windshield wiper;

Figure 2 is a side view of the wiper shown in Figure 1;

Figure 3 is a top view of the support or backing for the resilient wiper element;

Figure 4 is an enlarged transverse sectional view taken through the wiper to exemplify details of its construction;

Figure 5 is an enlarged partial top view of the secondary yoke showing one of a pair of locking elements utilized to detachably connect the ends of the primary yoke with the secondary yokes;

Figure 6 is a transverse section taken substantially on the line 6—6 of Figure 5 showing certain details of construction; and Figure 7 is an elevational view of the structure shown in Figure 5 with an end portion of the primary yoke connected to the secondary yoke.

As exemplified in the drawings, the blade assembly includes a resiliently flexible support 1 and a resilient wiper element 2. The support is elongated and of uniform thickness with corresponding reduced end extremities 3 and 4 and an intermediate portion 5 of a greater width than the extremities. This variation in width forms shoulders which provide longitudinally spaced abutment means 6 and 7. The support is preferably provided with an elongated narrow slot 8 terminating short of the ends of the support to provide connecting or hinge portions 9 whereby longitudinal parallel portions 10 of the support can be spread apart to enlarge the size of the slot so that the resilient element 2 can properly be located therein, after which the longitudinal portions 10 are released to cause such portions to interlock with the element. As further shown in Figure 3, each of the longitudinal portions is provided with an aperture for receiving a tool to assist in spreading the portions apart.

The resilient element 2 is preferably formed in one piece with opposed longitudinally extending exterior grooves 11 therein to provide a neck 12. The grooves 11 receive the inner marginal edge portions of the longitudinal portions 10 with the neck 12 between such portions so that upper portions 13 and lower portions 14 of the element engage the upper and lower surfaces of the support as depicted in Figure 4. The element is further formed with a second pair of opposed longitudinally extending exterior grooves 15 to provide a hinge 16 to permit a controlled pivotal movement of a wiping head 17 having wiping edges thereon as shown.

As set forth above the pressure distributing device preferably includes a pair of corresponding secondary yokes 18 and 19 having their ends detachably connected to the support, a primary yoke 20 having its ends detachably connected to intermediate portions of the secondary yokes, and a connector 21 carried by the primary yoke for detachable connection with a wiper arm. It was also pointed out that each of the yokes is preferably arcuate in cross-section.

The secondary yokes 18 and 19 are preferably identical in design and construction. The inner end of the base wall of each secondary yoke is formed to provide a transverse arcuate or curved edge 22 for rockably engaging the upper part of the wiper element. The inner end of each of these yokes is provided with a pair of corresponding ears 23. The outer end of each secondary yoke is provided with a shroud-like end wall 24 which serves to conceal the ends of the support. The outer end of each of the secondary yokes is also provided with a pair of ears 25 spaced inwardly from its end wall 24. As clearly shown in Figure 4, the outer end portion of the base wall of each of the secondary yokes may rockably bear against the upper or overlying portions 13 of the wiper element in a manner similar to the curved edges 22. The pairs of ears 23 and 25 of the yoke 18 extend under the reduced extremity 3 of the support and the corresponding ears of the yoke 19 similarly extend under the extremity 4 of the support to effect a sliding fit between these yokes and the support. The secondary yokes are preferably assembled with the support by merely sliding the yokes inwardly along the extremities of the support until the inner ends of the yokes engage the abutment means 6 and 7 after which the primary yoke is attached to the secondary yokes in a manner which will be subsequently described.

As pointed out above one of the objects of the invention is to provide improved means for detachably connecting the ends of the primary yoke to the secondary yokes. The means for this purpose includes providing each end of the primary yoke with a pair of inturned corresponding fingers 26, and the intermediate portion of each secondary yoke with a pair of openings generally designated 27 which lead to slots 28. More particularly in this regard, each opening includes a part 29 which initially receives one of the fingers, and a part 30 of a greater length than the part 29. Resilient or yieldable means preferably in the form of a generally T-shaped spring 31 constituting a locking element is secured substantially within the confines of each secondary yoke by a rivet 32 or equivalent means. Each spring includes a leg 33 through which the rivet extends and a pair of corresponding arms 34 and a leg 35 which is somewhat shorter, but coextensive with the leg 33. The springs are of a size and length and so connected to the yokes that they are readily yieldable and positive in action. The arms 34 are located in the parts 30 of the openings and normally yieldably bear upwardly against a shoulder 36 to close the slots 28. The parts 30 of the openings serve the dual purpose of providing clearance for the operation of the arms of the spring and as a passageway to permit entry of the fingers 26 on the primary yoke into the slots 28. Attention is directed to the fact that the arms are preferably notched to cooperate with marginal edges of the larger parts 30 of the openings so as to alleviate side play of the spring.

To connect an end of the primary yoke with a secondary yoke it is merely necessary to position the fingers 26 in the openings until they bear against the arms 34 of the spring; force is applied to depress the arms into the large parts 30 of the openings to clear the slots after which the fingers are inserted into the slots. The moment the fingers become seated in the slots, the spring is released so that it snaps back to its normal locking position with the arms bearing against the shoulders 36 to locate the arms in the plane of the fingers and thereby lock the fingers in a way that lateral rocking movement of the secondary yoke with respect to an end of the primary yoke is controlled to assist in obtaining proper movement of the blade assembly to promote a good wiping action.

Each of the secondary yokes is provided with an aperture 37 adjacent the short leg of each spring so that a member, such as a pin or nail, can be inserted into the aperture to engage and depress the spring so that the arms thereof will move downwardly into the larger parts of the opening to clear the slots and thereby permit release of the fingers on the primary yoke from the secondary yokes.

The detachable connections above described are simple to operate, but positive and efficient and offer advantages with respect to removing a worn or damaged blade assembly from the pressure device and replacing it with a new blade assembly.

Attention is directed to the fact that the fingers on the primary yoke are preferably interconnected with the slots in the secondary yokes after the latter are assembled on the support as stated above, but if found desirable one of the secondary yokes can be first connected with either end of the primary yoke, after which the secondary yokes are assembled with the support so that the other end of the primary yoke can be snapped into connection with the other secondary yoke. The arrangement thus affords more than one way of assembling the yokes with respect to one another and the support.

When the pressure device and blade assembly are operatively connected together as illustrated in Figures 1 and 2 the wiping edges of the wiper element may be caused to conform either to a curved or flat surface or combinations of such surfaces. Attention is also directed to the fact that the secondary yokes are formed so that portions thereof straddle the reduced extremities of the support and serve to substantially conceal the outer longitudinal edge portions of the support and prevent entry of foreign matter between these yokes and the support. The end hinge portions 9 of the support are concealed by the shrouded end walls of the secondary yokes. It is further apparent that the overlapping portions 13 of the wiping element under the secondary yokes are also substantially concealed.

In order to reduce noise or vibration between the pressure device and blade assembly the relationship between portions of the ends of the secondary yokes, the support and wiper element is such that the transverse curved marginal edges 22 provided on the inner ends of the secondary yokes will normally engage the upper surface of the upper part or overlapping portions 13 of the wiper element. Portions of the outer ends of the secondary yokes spaced from the end walls 24 also serve to engage the upper part of the element as shown in Figure 4. This bearing relationship between the element and secondary yokes provides a cushion for the parts and also assists in controlling relative lateral movement between these yokes and the blade assembly. Vibration is also reduced by limiting the extent of relative longitudinal movement between the blade assembly and pressure device. In other words, the distance between the inner ends of the secondary yokes and the abutment means 6 and 7 is predetermined so that just sufficient play is permitted to produce the desired working movement between the parts. Vibration or noise is further reduced by the relatively close fits established between the fingers on the primary yoke and the pairs of openings in the intermediate portions of the secondary yokes.

Having thus described my invention, it is obvious that various modifications may be made in the same without departing from the spirit of the invention, and, therefore, I do not wish to be understood as limiting myself to the exact form, construction, arrangement and combination of parts herein shown and described.

I claim:

1. A windshield wiper comprising: a blade assembly having a resilient wiping element and a resiliently flexible support therefor, said blade assembly being provided with spaced abutment means, a pressure distributing device having a pair of secondary yokes with the ends of the yokes respectively mounted on the blade assembly and the abutment means disposed between the inner ends of the secondary yokes, a primary yoke having ends respectively connected to the secondary yokes for holding the secondary yokes in close relation to the abutment means, and at least one of the connections being readily detachable while the secondary yokes are disposed in such relation.

2. A windshield wiper comprising: a blade assembly having a resilient wiping element and a resiliently flexible support therefor; abutment means provided on the assembly; a pressure distributing device having a plurality of pressure applying means operatively connected to the blade assembly, said device being provided with a connector for attaching the wiper to a wiper arm, said connecting means being detachable while said pressure-applying means are held in such relation.

3. A pressure distributing assembly comprising a pair of pressure members and a bridge for use with a windshield wiper blade, each of said members being provided with a seat, each end of the bridge having a projection disposed on a seat, and resilient means carried by each of the members for detachably holding the projections on the seats.

4. A pressure distributing assembly comprising a pair of pressure members for use with a windshield wiper blade, one of said members being provided with a seat, the other of said members being provided with a connector for attachment to a wiper arm and straddling the one member and having a projection remote from the connector disposed on the seat, and a latch permanently carried by said one member for detachably holding the projection on the seat.

5. A pressure distributing assembly comprising a pair of pressure members for use with a windshield wiper blade, one of said members being provided with a pair of seats and openings leading thereto and the other member being provided with a connector for attachment to a wiper arm and having a pair of projections remote from the connector disposed on the seats through said openings, and yieldable means secured to said one member for detachably holding the projections on said seats, said yieldable means being normally positioned to block placement of the projections onto the seats.

6. A pressure distributing assembly comprising a pair of pressure members for use with a windshield wiper blade, one of said members being provided with a pair of seats and openings leading thereto and the other member having a connector for attachment to a wiper arm and a pair of inturned projections remote from the connector received on the seats through the openings, and an elongated spring connected to said one member and having a movable portion for detachably holding the projections on the seats.

7. The structure defined in claim 6 in which the said one member is provided with another opening spaced from the first mentioned openings through which an element can be inserted to engage and move the movable portion of the spring to permit release of the projections from the seats.

8. In combination: a first member provided with recesses and openings leading to the recesses, a leaf spring secured to the member and having portions disposed in the openings normally closing the recesses, a second member having projections enterable through the openings and seated in the recesses, and said portions being movable by said projections in a direction to permit entry of the projections into the recesses.

9. Structure of the kind described comprising a member provided with a pair of corresponding seats and openings leading to the seats, abutment means provided on the member, a leaf spring carried by the member and provided with portions normally disposed relative to the abutment means to detachably lock entering parts on another member relative to the seats, and said member being provided with another opening affording access to the spring so the latter can be actuated.

10. Structure of the character described comprising a member provided with a pair of corresponding seats and openings leading to the seats, abutment means provided on the member, resiliently flexible locking means carried by the member and provided with portions normally engaging the abutment means to detachably lock entering parts on another member in engagement with the seats, the arrangement being such that the portions on the locking means are moved away from the seats upon introduction of the entering parts into the openings for engagement with the seats.

11. In combination: a first channel member having side portions provided with slot-like seats and openings leading to the seats, abutments on the member, an elongated spring having one extremity anchored in the channel and its other extremity being movable, said other extremity having a pair of offsets which are respectively disposed in the openings and bear against the abutments to normally block placement of projections on a second channel member onto the seats, and a second channel member of a size to at least partially receive the first channel member, said second channel member having inturned projections adjacent its side portions for placement on the seats through the openings, the arrangement being such that when the projections are inserted to predetermined distances into the openings the offsets of the spring will be moved off the abutments and thereby permit placement of the projections onto the seats whereupon the spring will automatically cause the offsets to reengage the abutments to lock the projections on the seats.

12. In combination: a first member having offset portions provided with slot-like seats and openings leading to the seats, abutments on the member, a spring having a portion anchored to the member and another portion which is movable, said movable portion having a pair of lateral portions which are respectively disposed in the openings and bear against the abutments to normally block placement of projections on a second member on the seats, and a second member having projections for straddling at least a portion of the first member for placement on the seats through the openings, the arrangement being such that when the projections are inserted to predetermined distances into the openings the lateral portions of the spring will be moved off the abutments and thereby permit placement of the projections on the seats whereupon the spring will automatically cause the lateral portions to reengage the abutments to lock the projections on the seats.

13. In combination: a first member having portions provided with slot-like seats and openings leading to the seats, abutments on the member, an elongated spring having one extremity anchored to the member and its other extremity being movable, said movable extremity having holding portions which are respectively disposed relative to the abutments for normally blocking placement of projections on a second member on the seats, and a second member having projections for placement on the seats through the openings, the arrangement being such that when the projections are inserted to predetermined positions in the openings the holding portions of the spring will be moved away from the abutments and thereby permit placement of the projections on the seats whereupon the spring will automatically cause the holding portions to take positions relative to the abutments for blocking release of the projections from said seats.

14. In combination: a first member provided with slot-like seats and openings leading to the seats, a spring having a portion anchored to the member and another portion which is movable, said movable portion being disposed to normally block placement of projections on a second member on the seats, and a second member for straddling at least a portion of the first member and having projections for placement on the seats through the openings, the arrangement being such that when the projections are inserted to predetermined distances into the openings the movable portion of the spring will be moved and thereby permit placement of the projections on the seats whereupon the spring will automatically move back to its normal blocking position to lock the projections on the seats.

15. In combination: a first member provided with slot-like seats and openings leading to the seats, a spring having a portion anchored to the member and another portion which is movable, said movable portion being disposed to normally block placement of projections on a second member on the seats, a second member for straddling at least a portion of the first member and having projections for placement on the seats through the openings, the arrangement being such that when the projections are inserted to predetermined distances into the openings the movable portion of the spring will be moved and thereby permit placement of the projections on the seats whereupon the spring will automatically move back to its normal blocking position to lock the projections on the seats, and means whereby the spring can be actuated to effect a release of the projections from the seats when desired.

References Cited in the file of this patent

UNITED STATES PATENTS

| | | |
|---|---|---|
| 24,649 | Marshall | July 5, 1859 |
| 369,067 | Macmillan | Aug. 30, 1887 |
| 2,264,167 | Paulus | Nov. 25, 1941 |
| 2,567,069 | Harley | Sept. 4, 1951 |
| 2,616,112 | Smulski | Nov. 4, 1952 |
| 2,667,656 | Oishei | Feb. 2, 1954 |
| 2,687,544 | Scinta | Aug. 31, 1954 |
| 2,747,213 | Oishei | May 29, 1956 |
| 2,782,445 | Krohm | Feb. 26, 1957 |

FOREIGN PATENTS

| | | |
|---|---|---|
| 683,375 | Great Britain | Nov. 26, 1952 |
| 1,051,298 | France | Sept. 16, 1953 |

UNITED STATES PATENT OFFICE

CERTIFICATE OF CORRECTION

Patent No. 2,897,529                                              August 4, 1959

Fred A. Krohm

It is hereby certified that error appears in the printed specification of the above numbered patent requiring correction and that the said Letters Patent should read as corrected below.

Column 4, line 70, after "wiper arm," insert the following line -- means connecting said pressure applying means for holding them in close relation to the abutment means, --;  column 6, line 5, strike out "inturned".

Signed and sealed this 1st day of March 1960.

(SEAL)
Attest:

KARL H. AXLINE
Attesting Officer

ROBERT C. WATSON
Commissioner of Patents